Figure 1:
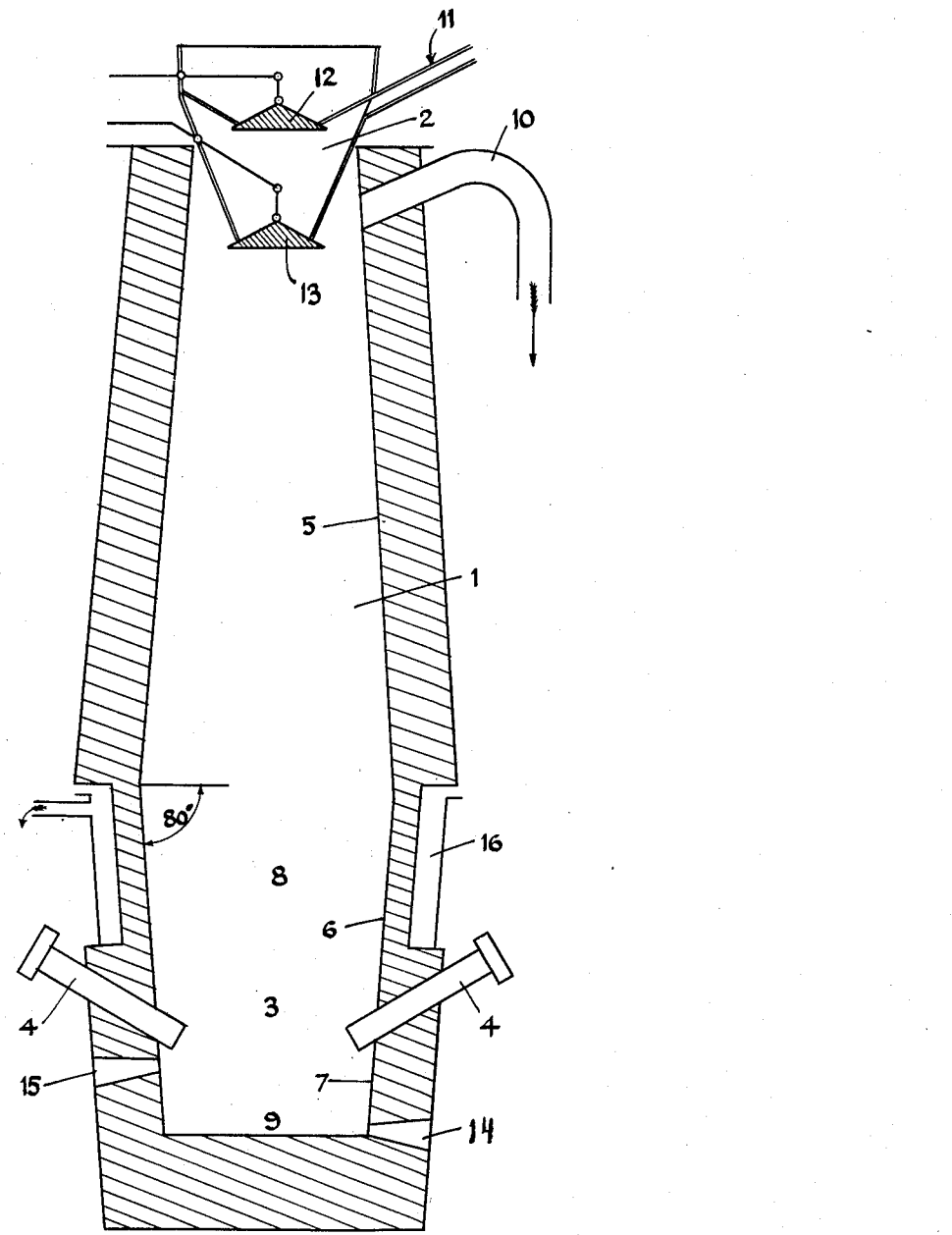

April 16, 1940.  C. S. FOX  2,197,688

PROCESS OF PRODUCING A CEMENT-FORMING MATERIAL

Filed June 23, 1938  2 Sheets-Sheet 2

Inventor:
C. S. Fox
By Glascock Downing & Seebold
Attys

UNITED STATES PATENT OFFICE 2,197,688

PROCESS OF PRODUCING A CEMENT-FORMING MATERIAL

Cyril Sankey Fox, Calcutta, British India, assignor to The Laterite Syndicate Limited, Calcutta, Bengal, British India, a syndicate of British India Application June 23, 1938, Serial No. 215,486
In British India July 3, 1937

12 Claims. (Cl. 75—30)

This invention relates to an improved two-stage process for manufacturing a calcium aluminate cement starting from aluminous and iron containing raw materials, whilst at the same time recovering the metallic iron contents of the raw material.

The cement which it is desired to be manufactured by means of the present invention, whilst being a calcium aluminate cement differs from ordinary calcium aluminate cements in that it is low in iron oxide content.

It is known that calcium aluminate cements may be made by fusing together suitable materials such as bauxites or laterites with lime. Usually the bauxites or laterites used have a considerable percentage of iron oxides and a lesser but quite appreciable percentage of titania therein, which iron oxides and titania remain in the finished cement product.

However, it requires a very considerable expenditure of heat to fuse together constituents which are suitably proportioned to form a first class calcium aluminate cement. A typical proportion of ingredients in such a cement is 50 parts of alumina, 45 parts lime and 7 to 9 parts silica. Usually in such cements there are additional ingredients such as 5 parts titania and 20 parts iron oxide as these cements frequently contain 20% or more of such metallic ingredients together with other impurities and inert matter which were originally present in the bauxite or raw materials.

It is also very difficult to make a calcium aluminate cement in a shaft furnace of the blast furnace type, partly because the materials used such as ordinary bauxite will not stand the pressure. Even where harder and stronger aluminous material of a suitable nature such as some kind of harder bauxites and certain laterites are available the process in a blast furnace can only be worked with difficulty and often does not produce the desired composition of cement required as the operation of a blast furnace working with the ingredients required for a good cement is difficult to control. The proper mixing and incorporation of the ingredients of the charge to flux the charge throughout is also difficult and is necessary if the formation of corundum (or emery), which remains in the cement, is to be avoided.

These difficulties are largely due to the nature of the raw materials used and the high temperatures demanded.

In blast furnace practice it has been found that as the alumina content in an ordinary slag rises the melting point of the slag rises and the fluidity becomes less, with the result that as the alumina content rises the working temperatures have to be raised so that they rapidly approach and reach uneconomical limits. In ordinary blast furnace practice with a slag having 13 to 15 percent. of alumina ($Al_2O_3$) and from 36 to 45 per cent. of silica ($SiO_2$) the melting point of the slag is about 1,310° C. to 1,410° C. The melting point of course varies with the particular composition of the slag, but as a rough idea the following approximate figures have been obtained with ordinary blast furnace slags according to the alumina content: 13 per cent. alumina 1,350° C.; 16 per cent. alumina 1,470° C.; 19 per cent. alumina 1,515° C. To obtain a free running slag the temperatures have to be 100° C., to 125° C. higher. There has been some uncertainty as to whether, in an ordinary blast furnace, it would be possible to deal with a slag in which the alumina content is as high as 40 per cent. or 50 per cent. It has been found, however that, provided the constituents of the charge in the blast furnace are incorporated so as to be properly fluxed throughout and provided the silica content of the slag is kept low, for instance to about 7 per cent., it is possible to raise the alumina content to 40 per cent. or 45 per cent. without needing a temperature greater than about 1,340° C. to 1,360° C. to cause the slag to melt. In these cases the lime in the slag may be from 53 per cent. to 48 per cent.

It has also been found that an eutectic composition exists which consists in 49.5% lime, 43.7% alumina and 6.8% silica, and it is therefore desirable that such an eutectic should, as far as is commercially or practically possible, be formed in practising the cement producing process, where a low melting, freely-flowing slag may be produced which can be more easily controlled.

Now, although it is possible that a composition having approximately 7 per cent. silica, 50 per cent. lime and 43 per cent. alumina may have satisfactory hydraulic and cementitious properties, it is not yet certain that such a composition will be completely suitable, and it is therefore also desirable that there should be produced a cement of super-quality having the percentages of lime and alumina the reverse approximately of those last mentioned.

It is also desirable to eliminate as far as possible the metallic iron content from the charge and to recover the said iron as a high grade pig iron, thus giving a calcium aluminate cement which is very low in iron oxides or as free therefrom as practically possible.

It is known that in the presence of a calcium aluminate slag, in which there is more aluminium oxide than silica and where the amount of silica is small, the metallic iron produced is of high grade.

It might be possible, provided the temperatures are sufficiently raised, to produce in one straight process not only an alumina cement of the highest quality, proportioned and adjusted in the said process so that it simply needs grinding thereafter to a suitable fineness without further adjustment to make the said super-cement, but also metallic iron of high quality, the whole being effected, if charge constituents of suitable purity and strength are available, in the blast furnace itself. As however to obtain coal and limestone of suitable silica-free quality is not easy and is somewhat expensive, and the temperatures needed are uneconomically high, it is preferred to divide the said straight process into two stages, and to recover the metallic iron and produce an aluminous slag of the approximate quality required in a blast furnace, and then to run off the said slag and adjust the said molten slag in a second stage in the process.

It is therefore a specific object of the present invention to produce by means of an improved two-stage process of such kind, and using as raw materials laterite, bauxite or the like, which may be soft aluminous materials not only a high grade or super-cement of the alumina cement variety but also a high grade iron, both of which commodities, whilst being produced together or at one time in complementary association, will be of a quality which will command a higher price than ordinary cement on the one hand or of ordinary pig iron on the other hand.

The invention has therefore for its further object to agglomerate, by briquetting or concreting, either part of the whole of the charge either for the blast furnace or for the correcting furnace, or for both, it being understood that where hereinafter reference is made to agglomerating part or the whole of a furnace charge, such reference is intended to cover specifically briquetting or concreting of the material.

With these objects in view, the invention consists in a two-stage process for producing a fused cement-forming composition or a cement when suitably ground using bauxite, laterite or the like aluminous and iron-containing raw materials, together with limestone, chalk or other calcium containing fluxing materials and fuel, with the elimination and/or recovery of the metallic iron from the charge, wherein the first stage is carried out in a blast furnace or one operating under reducing conditions to produce a slag or melt high in alumina but in which the proportion of calcium compound (lime) exceeds the alumina, for example 50% lime to 40-45% alumina, with the recovery of iron in this stage, and the said slag or melt is corrected in its composition in the second stage to give the desired composition for a calcium aluminate cement by the addition of bauxite, aluminous laterite or the like materials rich in alumina, and/or with further fluxing or with correcting materials if so desired, in a correcting furnace, the necessary extra heat being supplied to fuse the corrected material and wherein a part of, or the whole of, the furnace charge is agglomerated by cementing together, or briquetting, to form suitable sized lumps to feed to the furnaces in either or both stages of the process.

In order to be able to work the process in a blast furnace it is necessary that the material which is to be fed into the furnace as the charge should have sufficient strength to resist the pressure and sufficient hardness or toughness to resist the abrasion to which it will be subjected as it passes down through the blast furnace.

Many bauxites and some aluminous laterites which would otherwise be suitable as regards composition are not sufficiently strong, hard or tough to be used in a large blast furnace in their raw state without a prior treatment. Further, certain of the softer limestones and chalks, which would otherwise be quite suitable as fluxes, are not suitable for blast furnace work because of their mechanical or structural weakness.

Moreover, certain coals might be used if they were not so soft. Finally, where it is desired to recover a good proportion of metallic iron certain rich powdery iron ores might be used with the other constituents of the charge but for the fact that such are not normally suitable for use in the raw condition in a blast furnace.

The complete process of the invention, however, enables a blast furnace to be used in the first stage of the process whilst permitting bauxites, the softer laterites, or other aluminous material which would otherwise be too weak for the purpose now to be used by giving them a preliminary agglomerating treatment in the form of a concreting or briquetting treatment. By these means the basis of supply of one of the main ingredients of the charge may be widened. Similarly in regard to the fluxing material it is proposed to apply a briquetting or concreting treatment to limestones if they are too soft, or to chalks if available, to make these raw materials available and suitable for use in a blast furnace.

The same applies but to a lesser extent to the fuel supply and to the use of powdery iron ores, all of which may be rendered suitable for use in a blast furnace by briquetting or concreting together and breaking up into suitable sized lumps or pieces to feed to the furnace.

Furthermore, one of the difficulties in making a suitable calcium aluminate cement-forming melt is to avoid the production of corundum therein. Although corundum is not always formed its formation is an ever present source of danger. Corundum (or emery) is excessively hard, it is inert in the cement and adds to the cost of grinding the cement. In certain cases corundum is formed if the pieces of bauxite or laterite fed as part of the charge to the blast furnace are too large—as the cores of the lumps may become emery or corundum and in this form enter the slags without further changes. Further, corundum may be formed if the blast furnace lining, or the interior lining of the correcting furnace, is not of a suitable composition. The correcting furnace lining will preferably be of aluminous material substantially free from, or as low as possible in, silica.

Another object of the invention therefore is to avoid the formation of corundum and this is achieved in accordance with a further feature of the invention by intimately incorporating the bauxite or laterite with the fluxing material.

This is done by making the pieces of bauxite and limestone small and by thorough mixing of the two. It may still better be done by crushing the ingredients, mixing them in proper proportions and cementing the mixed material together (mixed also with fuel if desired) with a suitable calcareous cementing material. It is best to use a calcium aluminate cement for the cementing agent. It has been found that with a thorough "briquetting" of the charge mixed in the proper proportions so that the flux, and if desired the fuel, is in intimate incorporation in the correct proportions with the aluminous and iron constituents the best results may be achieved. By the term "briquetting" is also meant concreting the charge ingredient or ingredients together by using a calcareous cement binder, allowing the mass to set and breaking it up into pieces of the desired size for feeding into the blast or correcting furnaces.

It is not only desirable to concrete or "briquette" the charge for the blast furnace or first stage, but also or alternatively it is often advisable to briquette the correcting materials fed to the correcting furnace. Such correcting material usually will be bauxite or aluminous laterite high in alumina which is difficult to melt without a flux. The best results are attained if the fluxing material needed is incorporated with the aluminous material and the two cemented together with a calcium aluminate cement into suitable small-sized pieces. The cementing together also increases the basis of supply as crushed material and dust may be used which otherwise would be useless, because the draught used in the correcting furnace might otherwise carry the limestone power or powdery aluminous material away.

In practising the two-stage process according to the invention, some or the whole of the ingredient or ingredients of the charge which has or have insufficient crushing strength or resistance to pass through to the melting zone in the first stage of the process is or are cemented or briquetted together, either separately or mixed, using a calcareous cementing material, preferably a calcium aluminate cement, for the purpose. In addition, or alternatively, some or the whole of the correcting ingredient or ingredients of the charge added in the second stage is or are cemented or briquetted together, either separately or mixed, using a calcareous cementing material, for example a calcium aluminate cement, for the purpose.

According to the preferred method the new aluminous charge or the correcting material is mixed with fluxing material sufficient partly or wholly to flux it, and the mixture is cemented together with a calcareous cementing material, preferably with a calcium aluminate cement.

According to a preferred method the aluminous and fluxing material of the charge for the first stage are mixed and/or cemented together in those proportions in which, taking into consideration the silica content of the whole charge, they will form an eutectic slag, for example a melt having as near as practically possible the composition 49.5% lime, 43.7% alumina and 6.8% silica.

The advantage of forming an eutectic melt in the first stage or blast furnace stage is that there will be fuel economy and it is hoped that it will be more easy to control the composition and to keep the said composition more uniform.

For the second or adjusting stage the slag in its molten state is transferred to a correcting furnace in which the desired constituents to adjust the composition of the cement-forming material will be added.

Preferably the correcting material will be briquetted for melting up and will be in a molten condition when the slag from the first stage is allowed to run into the correcting furnace.

Thus, in carrying out this two-stage process a fluid, freely-flowing aluminous slag, preferably of a composition which is, or is as near as possible to, an eutectic slag, is formed in the first stage with the recovery of iron from the melt, the said slag is drawn off or allowed to flow, continuously if desired, into a separately heated correcting furnace in which the necessary proportions of correcting material to form the desired calcium aluminate cement composition is placed, preferably in a briquetted state, or after being concreted and then broken up into suitably sized lumps, and the mixture is fused or melted together. This freely-flowing slag from the first stage may be introduced into a separately heated correcting furnace in which already molten or fused correcting material is present, thereby to obtain, with agitation, a rapid and homogeneous incorporation of the ingredients in the second stage.

When it is desired to recover a large amount of metallic iron, rich powdered iron ores or powdery haematite may be briquetted with cement and added to the charge of the blast furnace used for the first stage of the process.

According to one manner of carrying out the process more than one correcting furnace is provided to each blast furnace used for the first stage of the process, and a continuous flow off of liquid slag into one or other of the correcting furnaces is effected to enable the process to be carried on continuously by preparing, using and emptying the correcting furnaces in sequence.

Although it is possible to work this process by selecting material in which the silica content of the whole charge is below 12 or 14%, it is better to keep this silica content as low as is commercially possible with the raw material which is available, and a silica content of not more than 9 to 10 per cent. should be aimed at, whilst, if it is possible to obtain suitable raw materials, the silica content in the slag may be reduced to be below 9% and preferably be as low as 6%, or even as 3%.

Laterites and bauxites often contain a large percentage of moisture or combined water therein which calls for a considerable expenditure of heat in order to drive off the said water. To conserve the amount of high grade fuel which is required in the first stage of the process carried out in the blast furnace it is advisable to give the bauxite, laterite or the like which is to be used a preliminary calcination prior to charging it into the blast furnace in order to drive off the large percentage of water contained therein. This preliminary calcination may be effected in a separate furnace which may be heated by the waste gases from the blast furnace. Alternatively, the excess moisture may be driven off by providing a large space between the upper and lower charging bells of the blast furnace used, in which space the charge constituents may remain for some time before being charged into the furnace so that the moisture is evaporated therefrom in said space.

The invention not only includes the processes set forth but also includes a calcium aluminate cement when produced by the said processes. It further includes a pig iron or metallic iron when produced as a by-product, or in a manner, or by a process as herein described.

Figure 2:
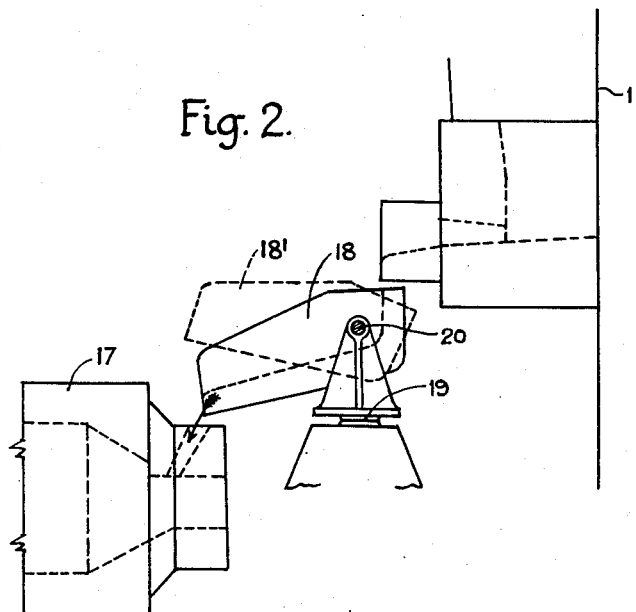
Figure 3:
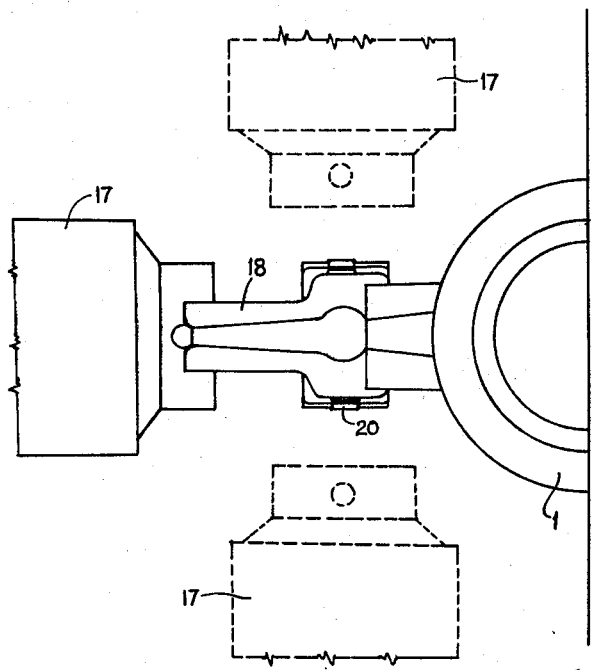

A preferred way of carrying the process of the invention into effect will now be described by way of example with reference to the accompanying drawings, in which:

Fig. 1 shows a suitable form of blast furnace in which the first stage of the process according to the invention may be carried out, and Figs. 2 and 3 are a side elevation and a plan view respectively showing diagrammatically how the slag from the blast furnace may be fed to a plurality of correcting furnaces in sequence.

With reference to Fig. 1, it will be seen that the body 1 of the blast furnace is particularly large. The size of the hopper 2 should also be large to hold a large charge of aluminous constituent such as laterite or bauxite and the limestone and coal, so that the moisture can be driven off before the material is dropped into the top of the furnace. The balance weights for the levers which open the bells of the hopper are not shown, nor are the bins for the laterite or bauxite and for the limestone and fuel shown. Charging platforms and ladders to the top of the furnace, and accessories such as pipe connections for the waste gases, hot blast and circulating water are not shown.

Suitable details for the blower for the hot blast, the stove for heating the blast to the highest economical temperature, dust catchers and cleaners for the waste gases and circulating water pumps will, of course, be needed. The blast furnace must work fairly hot as blast furnaces go, and, as the burden is large, the quantity of fuel and of hot blast will be larger than is normally required when only grey pig iron is being produced in an ordinary blast furnace.

This furnace using so high a temperature as say 1,700° C. in the zone of combustion 3, in front of the tuyères nozzles 4, 4, and so large an amount of lime and alumina, will yield a high grade metallic iron with perhaps some titanium therein. Consequently blast pressure of about 2.5 lbs. per sq. inch and blast temperature of about 1000° C. may be required as in the case of much larger furnaces. Finally, the firebrick or basic lining 5 of the furnace body 1, and the linings 6 and 7 of the boshes 8 and hearth 9 will have to be of good materials.

The pipe 10 leads off waste gases, whilst the small pipe 11 from the heated hopper 2 leads off moisture from the space between the two bells 12 and 13. In the case of the boshes 8 it is possible to use a high alumina fireclay, which may be rammed into position and slowly dried and heated when the furnace is first quietly and gradually blown in. The firebrick lining 7 of the hearth 9 should also be capable of standing working temperatures of 1,650° C.

In all these lining materials it is essential that their iron content is negligble or reactions may occur, for example by carbon deposition from carbon monoxide, leading to their disruption. However, the specifications for the refractory materials will not necessarily be any stricter than is insisted on for ordinary blast furnace work. The only difference introduced is the higher alumina content of the material used particularly in the boshes.

A relatively shallow hearth 9 is provided. This has a tapping hole 14 and a slag overflow or tapping outlet 15.

As it is important to keep up the temperature of the molten metal in the hearth the tuyères may be inclined downwards at say 35 to 40° with the horizontal to direct the blast downwards towards the centre of the hearth. Extra means (not shown) for supplying liquid or other suitable fuel to the combustion zone 3 may be provided.

The sides of the boshes should be made exceptionally steep to prevent scaffolding. In the illustration the slope is about 80° to the horizontal. Slopes of 75° to 82° are suitable.

The boshes may be water-cooled by using the jacket 16.

There may be considerable difficulty in getting a blast furnace started and to get it to work regularly for producing both a desired quality of pig iron and a suitable composition of slag for the subsequent correction in the second stage of the process to make into a calcium aluminate cement. It will generally be found advisable first to operate the blast furnace in the usual manner, as for smelting iron; but to modify its operation gradually, so that the feeding thereto of what are usually classed as iron ores or metallic iron producing constituents is gradually reduced and their place taken mainly or wholly by primary laterites, bauxites or the like having iron therein, the composition of which and of the fluxing material and fuel used being such that they are all low in silica, the whole or part of the alumina and/or if desired other constituents being briquetted or cemented, preferably with fluxing material before being fed to the furnace, and the said blast furnace is thus gradually worked up to produce as large a proportion as commercially possible of an aluminuous slag having an alumina content less than the lime content (and preferably of the eutectic composition 49.5% lime, 43.7% alumina and 6.8% silica which has a low melting point of 1,340° C. and pronounced fluidity at 1,500° C.), the slag composition thereafter being modified, while still in the molten state, by the addition of aluminous materials, preferably aluminous laterite or bauxite, to increase the alumina therein to be above that of the lime, to form a high class cement when ground up, with the recovery of metallic iron in the first part of the process. In getting this process started the briquetting or cementing together of the ingredients is not essential, but is carried out thereafter either in the first stage of the process or in the second stage, or both.

To effect said cementing together of any of the raw material used, any suitable calcareous cementing material such as hydraulic lime, natural cements, Portland cement or a high aluminous cement may be used, the ingredients being mixed together with the cement, water added, and the mixture allowed to set hard, and the mass then being broken up after hardening into pieces of suitable size to be used with the coke or coal or other constituents in the charge. It is, however, preferable, particularly when concreting or briquetting the charge of the blast furnace to use the same kind of calcium aluminate cement for the binding material as that which is produced by this process.

The percentage of cement which is required will depend very much upon the properties of the raw materials available and also upon the size of the blast furnace used. The briquetted or concreted constituents for the charge may require one part of cement to every three, four, six or eight parts of aluminous or fluxing material which is used, depending upon the strength of the material which is required. It should here be noted that the calcium aluminate cement which is made according to this process and which is free, or largely free, from iron is capable of binding the materials of the charge together in a way in which the said ingredients will still remain bound together as they pass through the furnace right down to the fusing zone of the blast furnace in a more satisfactory manner than would be possible with other calcium aluminate cements of known types which have a large proportion of iron oxide therein. Even in the correcting furnace the use of a calcium aluminate cement as formed by this process is to be preferred to the use of any other binding material. This is so not only because the said calcium aluminate cement is quick setting and has great strength and heat-resisting properties; but also because its addition to the materials used in the process helps to arrive at the desired composition of the final product.

Any suitable kind of correcting furnace may be used. This correcting furnace may be in the shape of a fore-hearth or of a reverberatory furnace, especially one of the rotating type, in which the slag from the blast furnace is further heated and is mixed with correctors to give it the desired enhanced aluminous content, and from which it is discharged, cooled and allowed to solidify, whereupon the solidified product may be broken up and subsequently ground to a fine powder to make the cement.

This correcting furnace may be separately heated, for example by the use of electricity, oil, gas, powdered coal or the like, or it may be partly heated at least with hot waste gases from the blast furnace which is used for the first stage of the process.

In order that the correction of the slag may be performed with rapidity and the mixing of the corrector with the slag be homogeneous, it is advisable for the corrector material to be introduced into the correcting furnace and to be heated up and melted therein, so as to be in a fluid or semi-fluid state, before the slag from the first stage of the process is introduced into the correcting furnace.

According to one method of carrying out this stage of the process according to the invention, a measured quantity of briquetted or cemented correcting material rich in aluminous constituents is added to the correcting furnace. The correcting furnace is heated and the liquid slag from the blast furnace stage is allowed to flow into the correcting furnace, preferably gradually, or as it is formed or collects, until a desired level is obtained in the correcting furnace, depending upon the measured quantity of correcting material provided and upon the composition of the incoming slag, the flow of the slag is discontinued and a thorough incorporation and fusing of the contents of the fluid bath in the correcting furnace is effected by intense heating, preferably combined with agitation. The said correcting furnace preferably is one of a tipping or rotary type, and the same may be caused to move, or to rotate, to mix the contents of the slag bath therein and be finally tipped or discharged to allow the corrected cement-forming material to cool and solidify.

As already indicated, to each blast furnace used for the first stage of the process more than one correcting furnace may be provided and a flow off of liquid slag into one or other of the correcting furnaces be effected, to enable the process to be carried on continuously by preparing, using and emptying the correcting furnaces in sequence.

This practice of the invention is illustrated diagrammatically by way of example in the accompanying Figs. 2 and 3 where to the single blast furnace 1 there corresponds three correcting furnaces 17. The three correcting furnaces 17 are of the rotary furnace type as previously explained to facilitate mixing of the contents and to discharge the same from the furnace. The feeding arrangement thereto for the slag from the blast furnace 1 consists of a gutter or trough member 18 lined with refractory material and which is mounted on a vertical axis 19 so that it can be swivelled to pour into any desired correcting furnace 17. It is also pivoted on a horizontal axis 20 so that it can be tilted from the position shown in full lines in Fig. 2 to the position 18' shown in dotted lines. In the position 18' shown in dotted lines, it forms a small reservoir so that if a second correcting furnace 17 is ready to receive the charge, the flow from the blast furnace 1 need not be stopped for the short space of time required to swivel the gutter or trough 18 round to the next furnace.

In the correcting furnace the constituents of the charge are adjusted so that in the final cement-forming product the proportions are approximately alumina 48 parts, lime 42 parts and silica under 7 parts, with or without inert constituents or impurities such as titania, corundum, iron oxide, magnesia, etc., which do or do not add to the hydraulic and cementitious properties of the melt when the whole is ground up to produce a high grade cement.

It is of course impossible to remove all the iron contained in the original charge fed to the blast furnace because as a general rule perhaps only 75 to 80% of this iron is recovered in the blast furnace stage. Nevertheless, the percentage of iron in the finished cement-forming material will be reduced so as to be very much below that which is usual in the ordinary aluminous cements, which often have as much as 20% of iron therein.

Laterites and bauxites contain a certain percentage of titania, some of which in this process will remain in the pig iron obtained from the first stage of the working, and such inclusion of titanium in the said pig iron will usually be found to improve the quality of the said metal. Considerable quantities of titania, however, remain in the cement-forming material and are present in the finished cement. This titania does not reduce the temperature to which the cement will stand being heated in the same way as does the presence of iron oxides in an aluminous cement. The calcium aluminate cement formed according to this process, having a much smaller proportion of iron oxide therein than is usual in calcium aluminate cements is in such respects of better quality.

It is of course impossible to obtain a cement-forming composition which consists throughout in the desired proportions of alumina, lime and silica which has been mentioned, as there will always be impurities and inert substances such as titania, corundum, iron oxide and magnesia, and it may be that the sum total of these cannot readily be kept down to less than 20% of the whole bulk of the finished cement. When however certain proportions are mentioned of ingredients, slags, melts or the like it is to be understood that there may be impurities and inert matter also.

Upon discharging the cement-forming constituents from the correcting furnace it is best to cast it into sheets which may be 3 or 4 inches thick, and allow it to cool and for it thereafter to be broken up preparatory to the fine grinding necessary to produce the desired cement. It is, of course, important that when the melt is discharged from the correcting furnace it shall not become contaminated with impurities, particularly with sand, hence it is best to cast the melt in troughs or trays or the equivalent, preferably in shallow metal troughs or trays, in order to prevent contamination. Such iron troughs or trays when used may be given a wash or paint of a slurry of fine bauxite or of aluminous laterite dust to which may be added slaked lime or limestone dust. The said wash or slurry may be sprayed upon the metal troughs, trays or plates so as to prevent the adherence of the slag thereto when it solidifies.

It will be understood that the process employed in practising the invention is one having great flexibility of control. By the proper adjustment of the ingredients of the charge the relative proportions of output of pig iron and of calcium aluminate cement-forming material may be adjusted to serve the requirements of the times. The two-stage process employed allows a wide range of choice of raw materials. It allows of the amount of raw material which is low in silica, and particularly silica-free or silica-low fuel, to be reduced, as the preliminary calcining may be done without fuel mixing with the charge constituents as a preliminary portion of the first stage, whilst in the second stage where the composition is corrected the heating again may be effected without the fuel necessarily coming into contact with the melt.

It will of course be understood that the second or correcting stage is not necessarily restricted to one in which the alumina content of the melt is increased, because it will readily be perceived that the composition may be adjusted in various directions in this second stage. For example, the second stage may be used not merely to reduce the lime percentage but also to reduce the silica percentage in the cement-forming composition. Under certain circumstances the iron oxide percentage may also be reduced in the second stage.

It is of course possible according to this invention to carry out the first stage of the process in a shaft furnace in which the charge is melted and to allow the melt to flow into a forehearth or further chamber in which the separation of the metallic iron from this slag takes place, the said metallic iron being tapped or separated and the slag then being transferred to a correcting furnace in which its composition is adjusted. Such a method of operation is however in this specification and in the appended claims to be understood as being a two-stage process just as much as the straight process of melting the charge and separating the metallic iron therefor in a blast furnace and the subsequent correction in a correcting furnace or furnaces of the slag is to be considered as being a two stage process.

I claim:

1. A two-stage furnace process for producing a fused cement-forming composition starting from a furnace charge consisting at least of an aluminous and iron-containing raw material, a calcium-containing fluxing material and fuel, characterised by the steps, in combination: (a) that a part at least of the charge to be used in the first stage of the process is cemented (briquetted) with a calcium aluminate cement to form suitable sized lumps to feed to the furnace; (b) that the said first stage of the process is carried out in a blast furnace whereinto the charge, including the cemented lumps, is fed and which operates to produce from the said charge a melt low in silica but high in alumina and calcium compound, with the proportion of calcium compound greater than that of the alumina, and with the elimination at least partially of iron in this stage; and (c) that for the second stage of the process the said melt obtained from the fusion of the charge in the blast furnace stage is led off from the blast furnace and is corrected in its composition by the addition thereto, to form therewith the charge in a correcting furnace, of correcting material to give by fusion of the corrected charge a greater proportion of alumina than calcium compound and the desired composition of the final calcium alumina cement.

2. A two-stage furnace process for producing a fused cement-forming composition starting from a furnace charge consisting at least of an aluminous and iron containing raw material, a calcium containing fluxing material and fuel, characterized by the steps, in combination: (a) that a part at least of the charge to be used in the first stage of the process is cemented (briquetted) with a calcium aluminate cement having the desired composition of the cement to be made and so as to form suitable sized lumps to feed the furnace; (b) that the said first stage of the process is carried out in a blast furnace whereinto the charge, including the cemented lumps, is fed and which operates to produce from the said charge a melt low in silica but high in alumina and calcium compound, with the proportion of calcium compound greater than that of the alumina, and with the elimination at least partially of iron in this stage; and (c) that for the second stage of the process the said melt obtained from the fusion of the charge in the blast furnace stage is led off from the blast furnace and is corrected in its composition by the addition thereto, to form therewith the charge in a correcting furnace, of correcting material together with the necessary extra heat for fusing the corrected material to give a greater proportion of alumina than calcium compound and the desired composition of the final calcium alumina cement.

3. A two-stage furnace process for producing a fused cement-forming composition starting from a furnace charge consisting at least of an aluminous and iron-containing raw material, a calcium containing fluxing material and fuel, characterised by the steps, in combination: (a) that a part at least of the aluminous raw material for the charge to be used in the first stage of the process is mixed with a quantity of a calcium-containing fluxing material sufficient at least partly to flux the same and the said mixture is cemented (briquetted) with a calcium aluminate cement to form suitable sized lumps to feed to the furnace; (b) that the said first stage of the process is carried out in a blast furnace whereinto the charge, including the cemented lumps, is fed and which operates to produce from the said charge a melt low in silica but high in alumina and calcium compound, with the proportion of calcium compound greater than that of the alumina, and with the elimination at least partially of iron in this stage; and (c) that for the second stage of the process the said melt obtained from the fusion of the charge in the blast furnace stage is led off from the blast furnace and is corrected in its composition by the addition thereto, to form therewith the charge in a correcting furnace, of correcting material together with the necessary extra heat for fusing the corrected material to give the desired composition for the final calcium alumina cement.

4. A two-stage furnace process for producing a fused cement-forming composition starting from a furnace charge consisting at least of an aluminous and iron-containing raw material, a calcium-containing fluxing material and fuel, characterised by the steps, in combination: (a) that a part at least of the charge to be used in the first stage of the process is cemented (briquetted) with a calcium aluminate cement to form suitable sized lumps to feed to the furnace; (b) that the said first stage of the process is carried out in a blast furnace whereinto the charge, including the cemented lumps, is fed and which operates to produce from the said charge a melt low in silica but high in alumina and calcium compound, with the proportion of calcium compound greater than that of the alumina, and with the elimination at least partially of iron in this stage; and (c) that for the second stage of the process the said melt obtained from the fusion of the charge in the blast furnace stage is led off from the blast furnace into a separately heated correcting furnace containing already molten aluminous corecting material and calcium-containing fluxing material, and is fused therewith, thereby to correct the composition of the melt by substantially reversing the lime to alumina ratio to give the desired composition for a calcium aluminate cement.

5. A two-stage furnace process for producing a fused cement-forming composition starting from a furnace charge consisting at least of an aluminous and iron-containing raw material, a calcium-containing fluxing material and fuel, characterised by the steps, in combination: (a) that a part at least of the charge to be used in the first stage of the process is cemented (briquetted) with a calcium aluminate cement to form suitable sized lumps to feed to the furnace; (b) that the said first stage of the process is carried out in a blast furnace whereinto the charge, including the cemented lumps, is fed and which operates to produce from the said charge a melt low in silica but high in alumina and calcium compound, with the proportion of calcium compound greater than that of the alumina, and with the elimination at least partially of iron in this stage; and (c) that for the second stage of the process the said melt obtained from the fusion of the charge in the blast furnace stage is led off from the blast furnace and is corrected in its composition by the addition thereto, to form therewith the charge in a correcting furnace, of correcting material together with the necessary extra heat for fusing the corrected material to give the desired composition for the final calcium alumina cement, more than one said correcting furnace being associated with the blast furnace of the first stage and a flow-off of liquid melt being effected into the said correcting furnaces in a desired sequence.

6. A two-stage process for producing a cement-forming composition according to claim 1, in which a part at least of aluminous correcting ingredients forming the charge in the second stage of the process is also cemented (briquetted) into suitable sized pieces using a calcium aluminate cement.

7. A process according to claim 1, in which when a large recovery of metallic iron is desired in the blast furnace stage, powdered rich iron ore is briquetted with calcium aluminate cement and is added to the charge of the blast furnace.

8. A process according to claim 1, in which the melt from the blast furnace is first caused to flow into a fore hearth associated with the blast furnace, where metallic iron is tapped off, and the remainder of the melt is thereafter transferred to a correcting furnace to have its composition corrected to the desired composition for the calcium aluminate cement.

9. A two-stage furnace process for producing a fused cement-forming composition starting from a furnace charge consisting at least of an aluminous and iron containing raw material, a calcium containing fluxing material and fuel characterised by the steps, in combination: (a) that a part at least of the charge to be used in the first stage of the process is cemented (briquetted) with a calcium aluminate cement to form suitable sized lumps to feed to the furnace; (b) that the said first stage of the process is carried out in a blast furnace whereinto the charge, including the cemented lumps, is fed and wherein the said alumina and iron-containing raw material and the fluxing material for the blast furnace charge are fused together in those proportions in which, taking into consideration the silica content of the whole charge, they will form an eutectic slag having as nearly as is practically possible the composition 49.5% lime, 43.7% alumina and 6.8% silica, with the elimination at least partially of iron in this stage; and (c) that for the second stage of the process the said eutectic melt obtained from the fusion of the charge in the blast furnace stage is led off from the blast furnace and is corrected in its composition by the addition thereto, to form therewith the charge in a correcting furnace, of aluminous correcting material in a quantity and under conditions such as to reverse approximately the proportions of lime to alumina as contained in the eutectic melt, together with the necessary extra heat for fusing the corrected material.

10. A two-stage process for producing a cement-forming composition according to claim 9, in which those parts at least of the aluminous charge and fluxing material which have insufficient crushing strength and resistance to abrasion to pass through to the melting zone in the blast furnace stage of the process are cemented (briquetted) together using a calcium aluminate cement of the desired composition of the cement to be made and in proportions such as to give the desired eutectic melt.

11. A two-stage process for producing a cement-forming composition according to claim 9, in which the aluminous correcting material in the second stage of the process is mixed with a quantity of fluxing material sufficient partly or wholly to flux it and the mixture is cemented together with a calcium aluminate cement of the desired composition of the cement to be made.

12. A two-stage process according to claim 9, in which the freely-flowing eutectic melt from the blast furnace stage is introduced into a separately heated correcting furnace in which already molten aluminous and flux-containing correcting material is present, whereby there is obtained with agitation a rapid and homogeneous incorporation of the ingredients in the second stage.

CYRIL SANKEY FOX.